(12) United States Patent
De Cesare et al.

(10) Patent No.: US 11,608,794 B2
(45) Date of Patent: Mar. 21, 2023

(54) METHOD TO ESTIMATE THE TEMPERATURE OF AN ELECTROMAGNETIC ACTUATOR

(71) Applicant: MARELLI EUROPE S.p.A., Corbetta (IT)

(72) Inventors: Matteo De Cesare, Torremaggiore (IT); Claudio Guido, Bologna (IT); Marco Parotto, Bologna (IT)

(73) Assignee: MARELLI EUROPE S.p.A., Corbetta (IT)

( * ) Notice: Subject to any disclaimer, the term of this patent is extended or adjusted under 35 U.S.C. 154(b) by 0 days.

(21) Appl. No.: 17/804,341

(22) Filed: May 27, 2022

(65) Prior Publication Data
US 2022/0381195 A1 Dec. 1, 2022

(30) Foreign Application Priority Data

May 31, 2021 (IT) .......................... 102021000014201

(51) Int. Cl.
*F02D 41/20* (2006.01)
*F02D 41/22* (2006.01)
(Continued)

(52) U.S. Cl.
CPC .......... *F02D 41/221* (2013.01); *F02D 41/20* (2013.01); *F02D 41/402* (2013.01);
(Continued)

(58) Field of Classification Search
CPC ..... F02D 2041/2058; F02D 2041/2062; F02D 2041/2065; F02D 2041/224; H01F 7/1844
See application file for complete search history.

(56) References Cited

U.S. PATENT DOCUMENTS 9,458,748 B2  10/2016 David et al.
10,364,769 B2  7/2019 Faied et al.
(Continued)

FOREIGN PATENT DOCUMENTS

CN  104929838 A  9/2015
DE  10149982 A1  4/2003
(Continued)

OTHER PUBLICATIONS

Communication dated Oct. 11, 2022 for European Application No. 22174802.3 transmitting the extended European Search Report dated Sep. 28, 2022.
(Continued)

*Primary Examiner* — Erick R Solis
(74) *Attorney, Agent, or Firm* — Howard & Howard Attorneys PLLC

(57) ABSTRACT

A method to estimate the temperature of an electromagnetic actuator, which entails a preliminary step in which to define a first threshold value for the current or for the voltage; and define a characteristic curve of the actuator family in the plane temperature/time needed to reach the threshold value; a step in which to carry out a reference measurement, in which, using the characteristic curve, a reference time needed by the electromagnetic actuator to reach the first threshold value is associated with a known reference temperature; and a step in which to carry out a series of measurements in which to determine the time needed by the electromagnetic actuator to reach the first threshold value, calculate the deviation between the time needed by the electromagnetic actuator to reach the first threshold value and the reference time; and determine the temperature of the electromagnetic actuator, using the characteristic curve, by associating the temperature of the electromagnetic actuator with the sum of the deviation and of the reference time.

9 Claims, 6 Drawing Sheets

(51) Int. Cl.
*H01F 7/18* (2006.01)
*F02D 41/40* (2006.01)

(52) U.S. Cl.
CPC ... *H01F 7/1844* (2013.01); *F02D 2041/2058* (2013.01); *F02D 2041/2062* (2013.01); *F02D 2041/2065* (2013.01); *F02D 2041/224* (2013.01); *F02D 2250/31* (2013.01)

(56) References Cited

U.S. PATENT DOCUMENTS

| | | |
|---|---|---|
| 10,711,675 B2 | 7/2020 | Sykes et al. |
| 2010/0106300 A1* | 4/2010 | Kaluza .................... F02D 41/20 700/275 |
| 2015/0267663 A1 | 9/2015 | Namudur et al. |
| 2015/0267664 A1* | 9/2015 | Namuduri ............... F02D 41/20 239/71 |
| 2016/0298565 A1 | 10/2016 | Nagatomo et al. |

FOREIGN PATENT DOCUMENTS

| | | |
|---|---|---|
| DE | 102012218327 A1 | 4/2014 |
| EP | 2075446 A2 | 7/2009 |

OTHER PUBLICATIONS

Search Report for Italian Patent Application No. 202100014201 dated Feb. 16, 2022.

\* cited by examiner

METHOD TO ESTIMATE THE TEMPERATURE OF AN ELECTROMAGNETIC ACTUATOR

CROSS-REFERENCE TO RELATED APPLICATIONS

This patent application claims priority from Italian patent application no. 102021000014201 filed on May 31, 2021, the entire disclosure of which is incorporated herein by reference.

TECHNICAL SECTOR

The invention relates to a method to estimate the temperature of an electromagnetic actuator.

PRIOR ART

As it is known, an internal combustion engine is typically provided with a number of electromagnetic actuators exposed, during their normal operation, to high temperatures and subjected to thermal stresses, such as, for example, fuel injectors for direction injection systems (GDI), injectors for a water solution of urea for a SCR (Selective Catalytic Reduction) system for the after-treatment of $NO_x$ molecules or burners used in an exhaust gas after-treatment system.

Therefore, being able to detect and control the temperature of said electromagnetic actuators, in order to prevent them from overheating, is extremely important; for this reason, each electromagnetic actuator is provided with a sensor, which is designed to detect the temperature thereof. However, this solution is disadvantageous from an economic point of view, since it requires the installation and the following maintenance of a number of dedicated sensors.

U.S. Ser. No. 10/364,769, on the other hand, describes a method to detect leaks through the sealing seat in electromagnetic actuator of an internal combustion engine having a coil, which entails a step, in which a controller monitors a combustion event in order to determine an amount of time needed by the current flowing through the coil to reach a peak current. The amount of time needed by the current to reach the peak current depends on the temperature of the coil of the injector. Furthermore, a step is provided, in which the controller compares said amount of time with a threshold value corresponding to a predetermined temperature of the coil and, in case the amount of time is greater than the threshold value, a leak through the sealing seat of the actuator is recognized. Hence, the solution described above allows the temperature of the electromagnetic actuator to be estimated through the time needed to reach the peak current. However, the Applicant found out that the time needed to reach the peak current (and, hence, the temperature) is also affected by the tolerances of the components of the electromagnetic actuator and, therefore, the estimate cannot be sufficiently reliable and strong; in particular, the comparison with the threshold value could lead to wrong recognitions of leaks through the sealing seat of the actuator.

DESCRIPTION OF THE INVENTION

The object of the invention is to provide a method to estimate the temperature of an electromagnetic actuator, said method not suffering from the drawbacks described above and, in particular, being easy and economic to be implemented.

According to the invention, there is provided a method to estimate the temperature of an electromagnetic actuator according to the appended claims.

BRIEF DESCRIPTION OF THE DRAWINGS

The invention will now be described with reference to the accompanying drawings showing a non-limiting embodiment thereof, wherein.

PREFERRED EMBODIMENTS OF THE INVENTION

Figure 1:
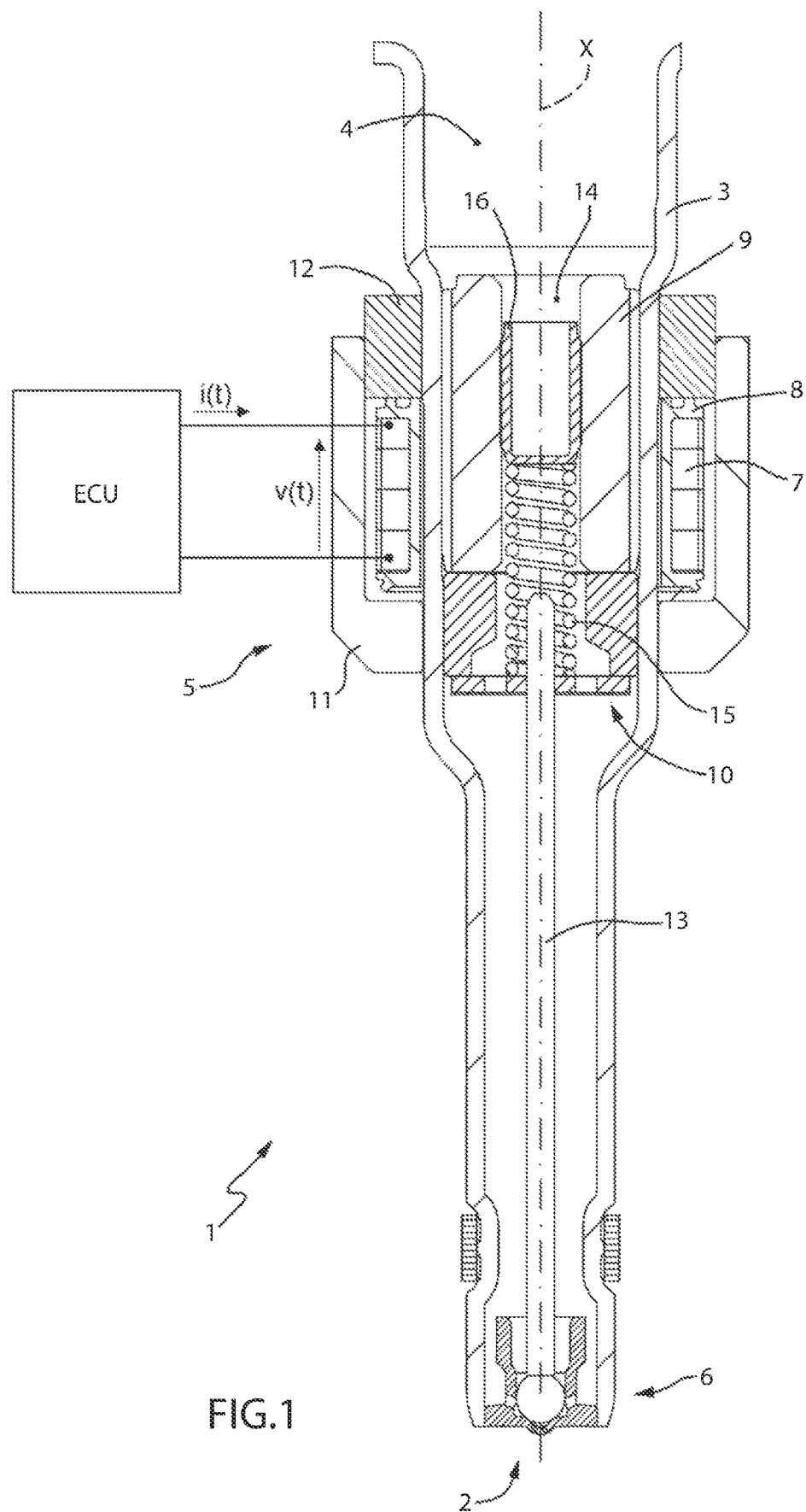
FIG. 1 is a schematic, side-elevation and cross-sectional view of an electromagnetic fuel injector and of an electronic control unit implementing the control method according to the invention.

In FIG. 1, number 1 indicates, as a whole, an electromagnetic injector 1 having a cylindrical symmetry around a longitudinal axis X and controlled so as to inject fuel from an injection nozzle 2. The electromagnetic injector 1 comprises a support body 3, which has a cylindrical tubular shape with a variable cross-section along the longitudinal axis X and has a supply channel 4 extending along the entire length of the support body 3 so as to supply the fuel under pressure to the injection nozzle 2. The support body 3 supports, in the area of an upper portion of its, an electromagnetic actuator 5 and, in the area of a lower portion of its, an injection valve 6, which delimits the supply channel 4 at the bottom.

In use, the injection valve 6 is operated by the electromagnetic actuator 5 in order to adjust the flow of fuel through the injection nozzle 2, which is obtained in the area of the injection valve 6.

The electromagnetic actuator 5 comprises a coil 7, which is arranged on the outside around the support body 3 and is enclosed in a toroidal casing 8 made of a plastic material, and a fixed magnetic pole 9, which is made of a ferromagnetic material and is arranged inside the support body 3 in the area of the coil 7. Furthermore, the electromagnetic actuator 5 comprises a movable armature 10, which has a cylindrical shape, is made of a ferromagnetic material and is designed to be magnetically attracted by the magnetic pole 9 when the coil 7 is energized (i.e. a current flows through it).

Finally, the electromagnetic actuator 5 comprises a tubular magnetic armature 11, which is made of a ferromagnetic material, is arranged on the outside of the support body 3 and comprises an annular seat to house, on the inside, the coil 7, and a magnetic washer 12 with an annular shape, which is made of a ferromagnetic material and is arranged above the coil 7 to guide the closing of the magnetic flux around the coil 7.

The movable armature 10 is part of a movable equipment, which comprises, furthermore, a shutter or plunger 13 having an upper portion integral to the movable armature 10 and a lower portion cooperating with a valve seat of the injection valve 6 so as to adjust, in a known manner, the flow of fuel towards the injection nozzle 2. In particular, the plunger 13 ends with a shutting head with a substantially spherical shape, which is designed to rest against the valve seat in a sealing manner.

The magnetic pole 9 is perforated at the centre and has a central through hole 14, which partially houses a closing spring 15, which pushes the movable armature 10 towards a closed position of the injection valve 6. In particular, inside the central hole 14 of the magnetic pole 9 there is fitted, in a fixed position, a striker element 16, which keeps the closing spring 15 compressed against the movable armature 10.

The coil 7 is powered by an electronic control unit ECU, which applies, at the ends of the coil 7, a voltage V variable over time, which causes a current i variable over time to flow through the coil 7.

Figure 2:
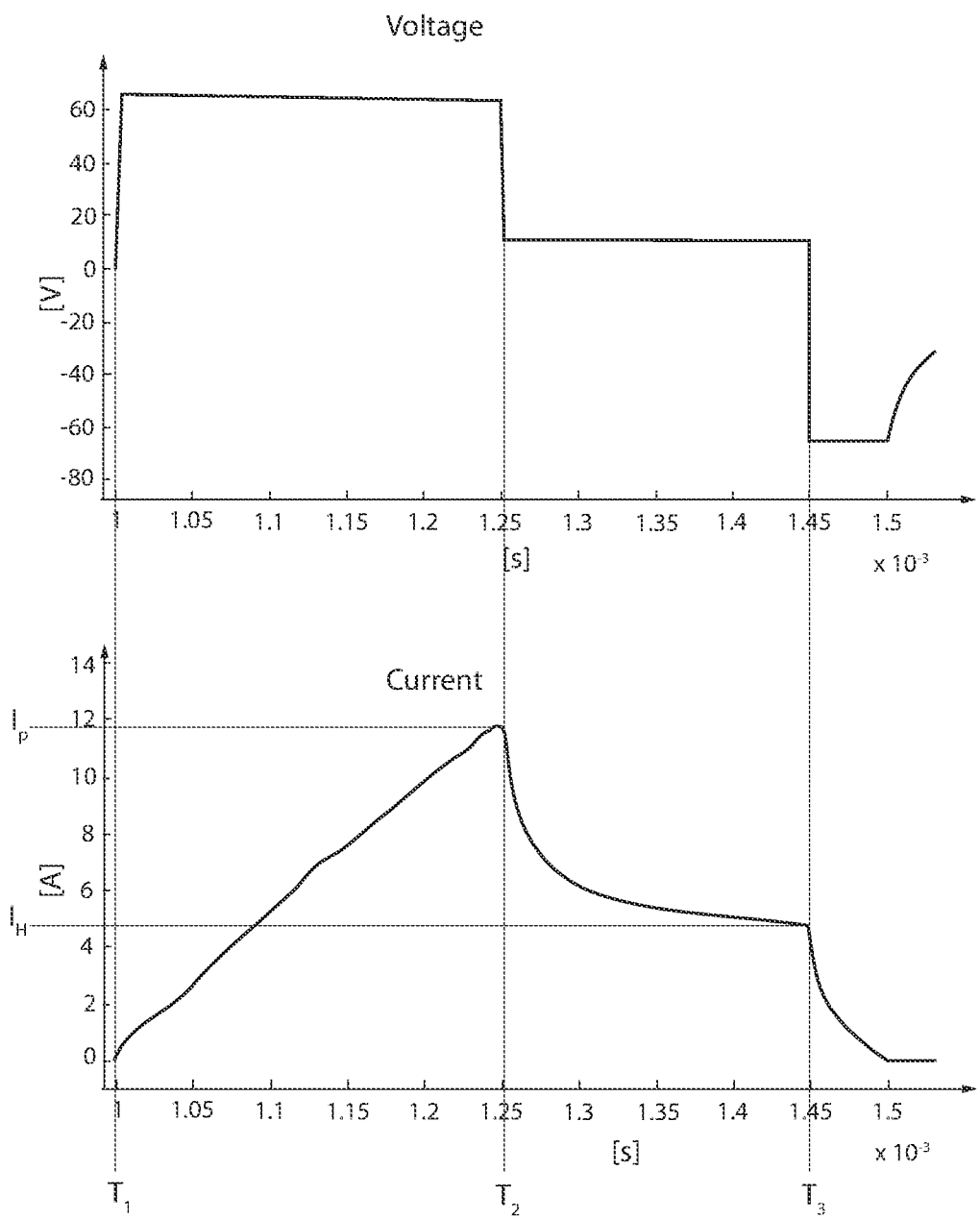
FIG. 2 is a diagram showing a first variant of the control profile of the electromagnetic fuel injector of FIG. 1.
Figure 3:
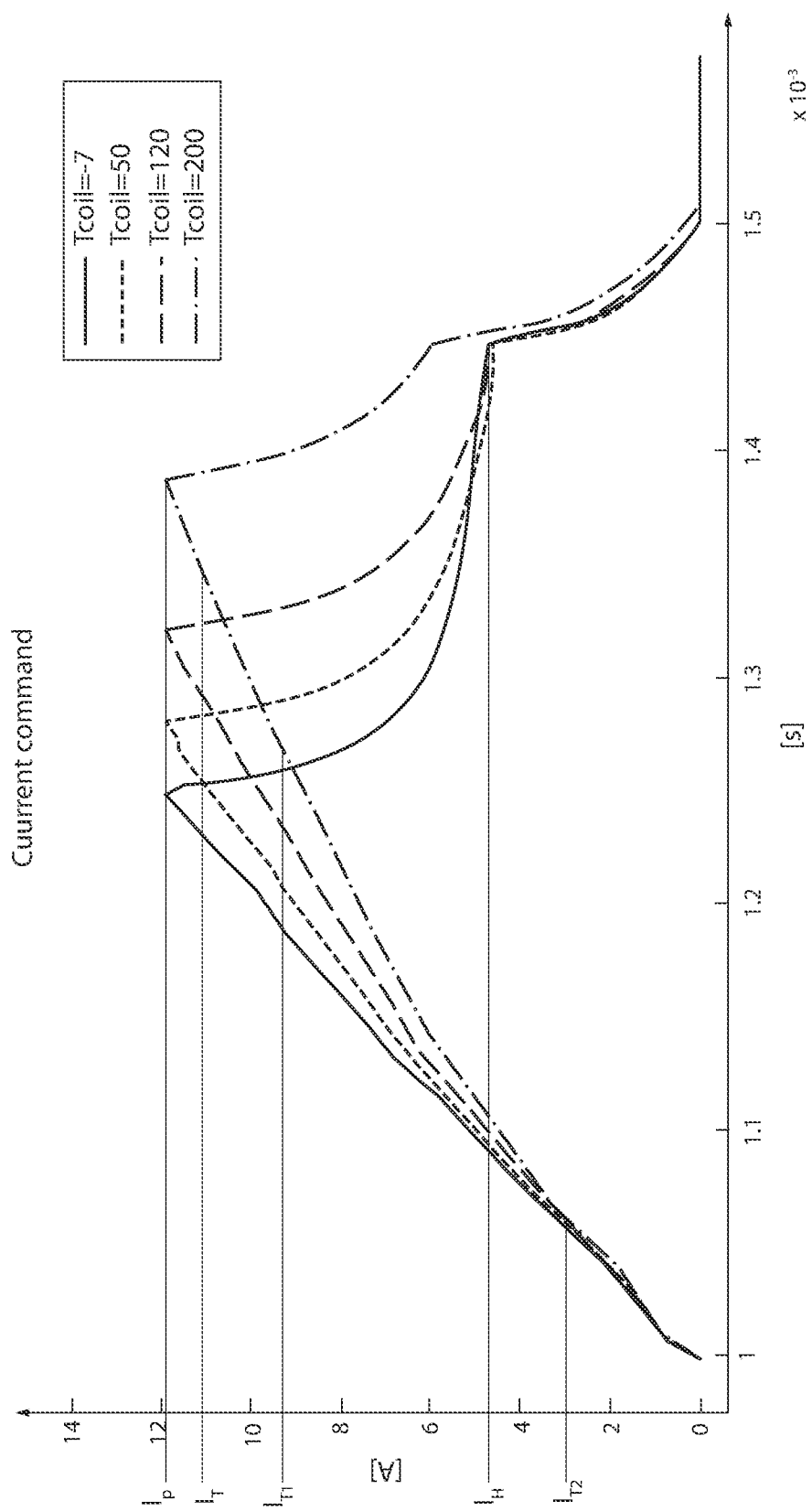
FIG. 3 is a diagram showing the variation over time of the current flowing through a coil of the electromagnetic injector of FIG. 2 as a function of the temperature.

In particular, according to a first variant shown in FIG. 2 (control known as "peak and hold"), in the amount of time from $T_1$ to $T_2$, the current flowing through the coil 7 increases until it reaches the peak current $I_P$. The peak current $I_P$ usually is equal to 12 A. During this amount of time, the movable armature 10 is magnetically attracted by the magnetic pole 9 against the elastic force of the closing spring 15 and the fuel pressure force and the movable armature 10 together with the plunger 13 (i.e. the movable equipment) move upwards, due to the magnetic attraction exerted by the magnetic pole 9, up to an upper limit position, in which the movable armature 10 strikes against the magnetic pole 9 and the shutting head of the plunger 13 is lifted relative to the valve seat of the injection valve 6 allowing fuel under pressure to flow through the injection nozzle 2.

In the instant $T_2$, the current flowing through the coil 7 reaches the peak current $I_P$ and quickly decreases to the holding current $I_H$ of the injection valve 6. In the amount of time ranging from $T_2$ to $T_3$, the current flowing through the coil 7 is limited to the holding $I_H$ current of the injection valve 6 in order to ensure a linear fuel flow. In the instant $T_3$, a negative voltage is applied, which is maintained as such until the current flowing through the coil 7 is zero (and, as a consequence, until the electromagnetic force is cancelled as well). Then, the elastic force of the closing spring 15 pushes the movable armature 10 together with the plunger 13 (i.e. the movable equipment) downwards up to a lower limit position, in which the shutting head of the plunger 13 is pressed against the valve seat of the injection valve 15 insulating the injection nozzle 11 from the fuel under pressure.

Experiments have shown that the temperature of the electromagnetic injector 1 changes as a function of the time needed to reach the peak current $I_P$. Hence, in a preliminary set-up phase, a threshold value $I_T$ of the current flowing through the coil 7 is defined, which is smaller than the peak current $I_P$. For example, the threshold value $I_T$ of the current flowing through the coil 7 is equal to 10 A.

According to a preferred variant, the threshold value $I_T$ of the current flowing through the coil 7 is defined in a preliminary set-up phase and is equal to a value that prevents possible ferromagnetic material saturation phenomena from happening.

According to a further variant, the threshold value $I_T$ of the current flowing through the coil 7 is defined in a preliminary set-up phase and is equal to a percentage of the peak current $I_P$ (for example, the threshold value $I_T$ of the current flowing through the coil 7 corresponds to approximately 80% of the peak current $I_P$).

Alternatively, experiments have shown that the temperature of the electromagnetic injector 1 changes as a function of the time needed to shift from a threshold value $I_{T1}$ to a threshold value $I_{T2}$ of the current flowing through the coil 7. Hence, in a preliminary set-up phase, the threshold value $I_{T1}$ and the threshold value $I_{T2}$ of the current flowing through the coil 7 are defined, both smaller than the peak current $I_P$. For example, the threshold value $I_{T1}$ of the current flowing through the coil 7 is equal to 10 A and the threshold value $I_{T2}$ of the current flowing through the coil 7 is equal to 1.5 A. In other words, the temperature of the electromagnetic injector 1 changes as a function of the slope with which the current flowing through the coil 7 increases.

Figure 4:
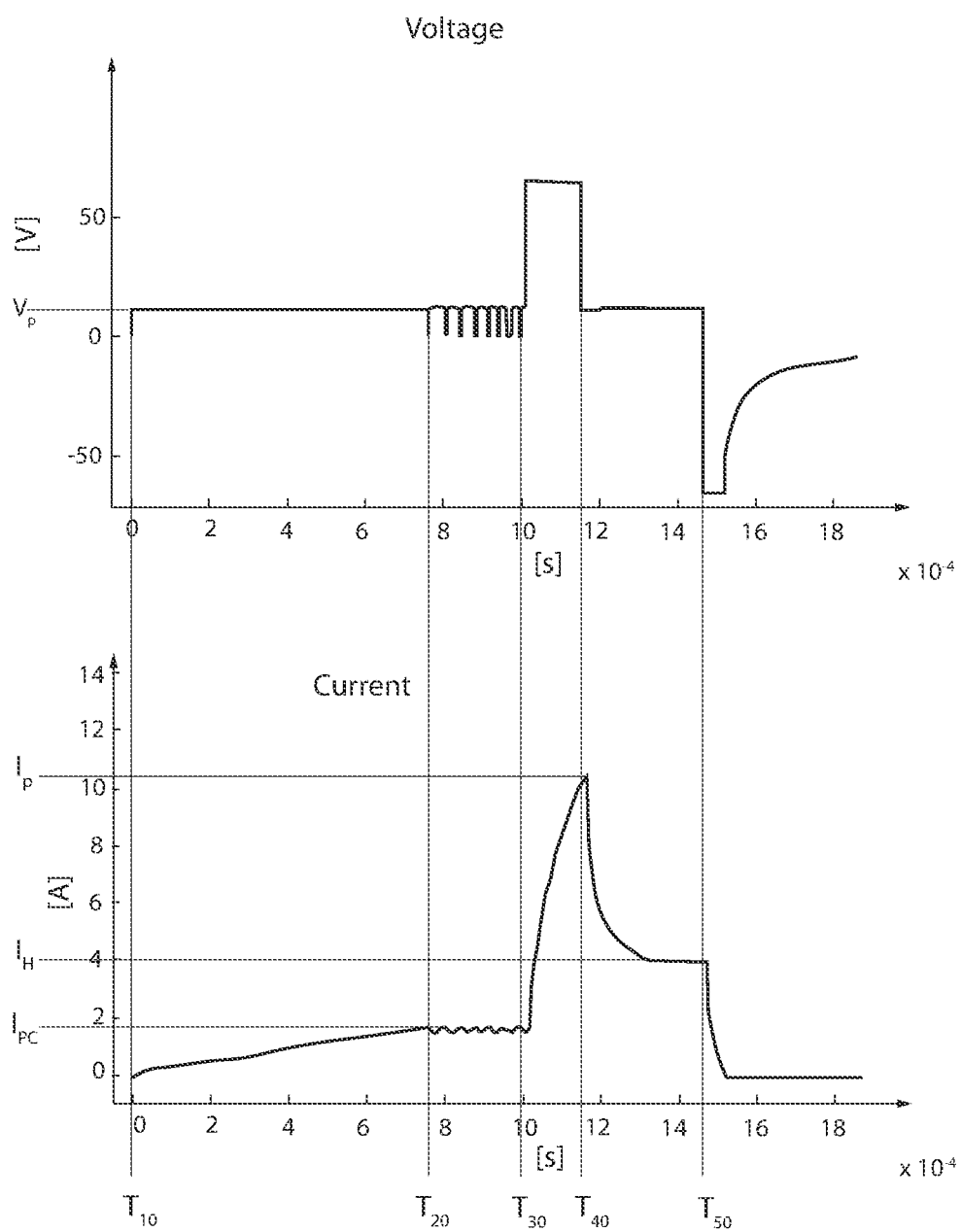
FIG. 4 is a diagram showing a second variant of the control profile of the electromagnetic fuel injector of FIG. 1.
Figure 5:
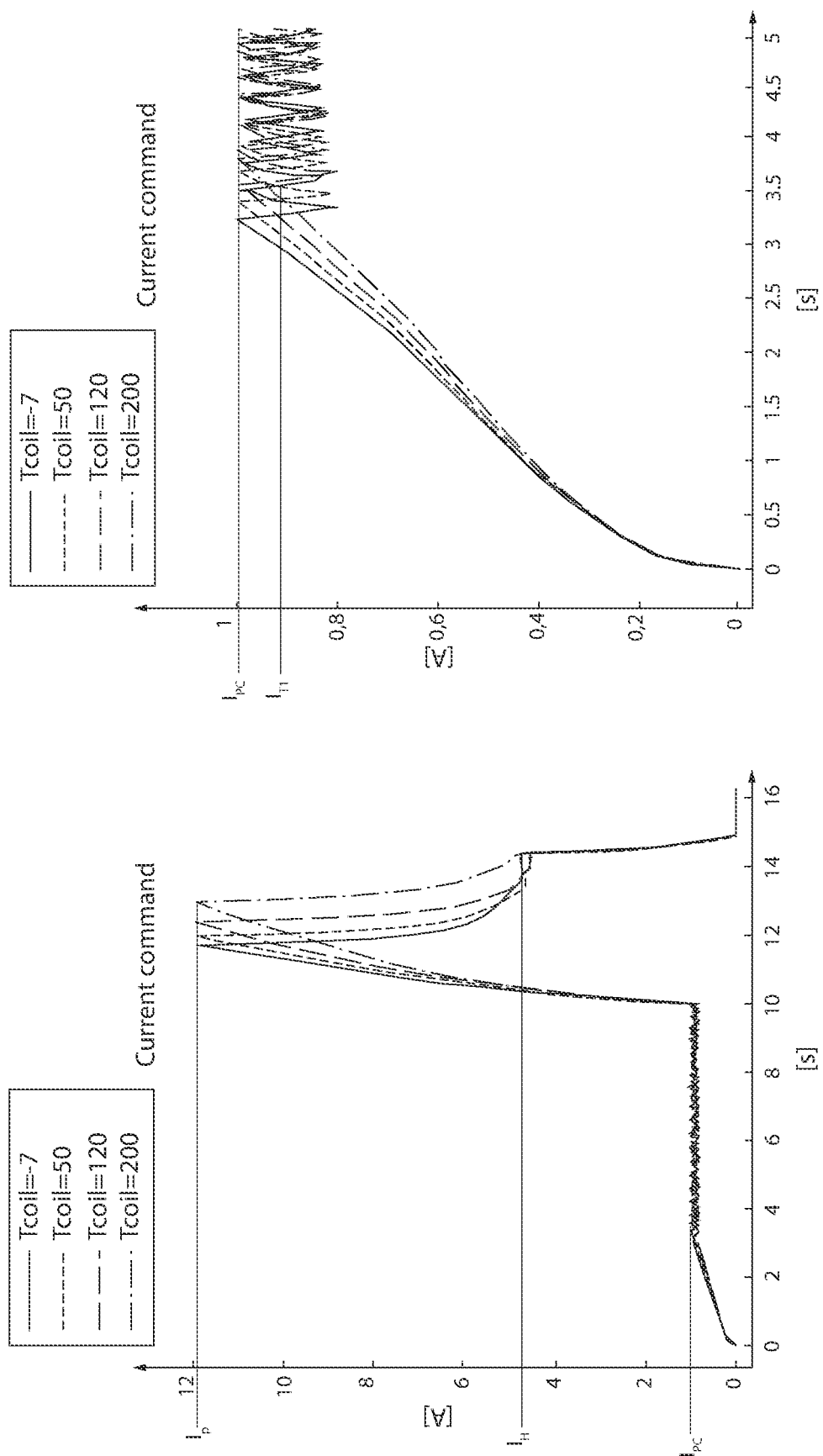
FIG. 5 is a diagram showing the variation over time of the current flowing through a coil of the electromagnetic injector of FIG. 4 as a function of the temperature.

According to a second variant shown in FIG. 4 (control known as "peak and hold with pre-charging"), when the electronic control unit ECU opens the electromagnetic injector 1, the reaching of the peak current $I_P$ is preceded by a pre-magnetization ("pre-charging") phase. In particular, in the time instant $T_{10}$, a pre-charge voltage $V_P$ is applied and, in the amount of time ranging from $T_{10}$ to $T_{20}$, the current flowing through the coil 7 gradually increases based on inductance and on resistance until the pre-charge current $T_{PC}$ is reached. In the amount of time ranging from $T_{20}$ to $T_{30}$, the current flowing through the coil stabilizes itself at the pre-charge current value $I_{PC}$, which is below the current value that would move the movable armature 10 together with the plunger 13 (i.e. the movable equipment). In the amount of time ranging from $T_{30}$ to $T_{40}$, the current flowing through the coil 7 increases until it reaches the peak current $I_P$. During this amount of time, the movable armature 10 is magnetically attracted by the magnetic pole 9 against the elastic force of the closing spring 15 and the fuel pressure force and the movable armature 10 together with the plunger 13 (i.e. the movable equipment) move upwards, due to the magnetic attraction exerted by the magnetic pole 9, up to an upper limit position, in which the movable armature 10 strikes against the magnetic pole 9 and the shutting head of the plunger 13 is lifted relative to the valve seat of the injection valve 6 allowing fuel under pressure to flow through the injection nozzle 2.

In the instant $T_{40}$, the current flowing through the coil 7 reaches the peak current $I_P$ and quickly decreases to the holding current $I_H$ of the injection valve 6. In the amount of time ranging from $T_{40}$ to $T_{50}$, the current flowing through the coil 7 is limited to the holding $I_H$ current of the injection valve 6 in order to ensure a linear fuel flow. In the instant $T_{50}$, the current is interrupted so that no current flows through the coil 7. Then, the elastic force of the closing spring 15 pushes the movable armature 10 together with the plunger 13 (i.e. the movable equipment) downwards up to a lower limit position, in which the shutting head of the plunger 13 is pressed against the valve seat of the injection valve 15 insulating the injection nozzle 11 from the fuel under pressure.

Experiments have shown that the temperature of the electromagnetic injector 1 changes as a function of the time needed to reach the pre-charge current $I_{PC}$. Hence, in a preliminary set-up phase, a threshold value $I_T^*$ of the current flowing through the coil 7 is defined, which is smaller than or equal to the pre-charge current $I_{PC}$. For example, the threshold value $I_T^*$ of the current flowing through the coil 7 is equal to 1 A.

According to FIG. 4, it is possible to check whether, in the amount of time ranging from $T_{20}$ and $T_{30}$, when the current flowing through the coil 7 stabilizes at the pre-charge current value $I_{PC}$, the electronic control unit ECU is capable of turning on and off the voltage applied at the ends of the coil 7, so as to keep the current substantially constant and, indeed, equal to the pre-charge current value $I_{PC}$. Hence, the first zeroing (or turning off) of the voltage applied at the ends of the coil 7 takes place in the instant $T_{20}$, in which the current flowing through the coil 7 reaches the pre-charge current value $I_{PC}$.

Therefore, the temperature of the electromagnetic injector 1 changes depending on the time needed by the voltage applied at the ends of the coil 7 to enter a "splitting" (on and off) phase; in other words, the temperature of the electromagnetic injector 1 changes as a function of the time needed by the voltage applied at the ends of the coil 7 to reach the first zeroing. In this case, the threshold value is represented by the zero current value applied at the ends of the coil 7.

The method implemented in order to determine the temperature of the electromagnetic injector 1 is described below.

Figure 6:
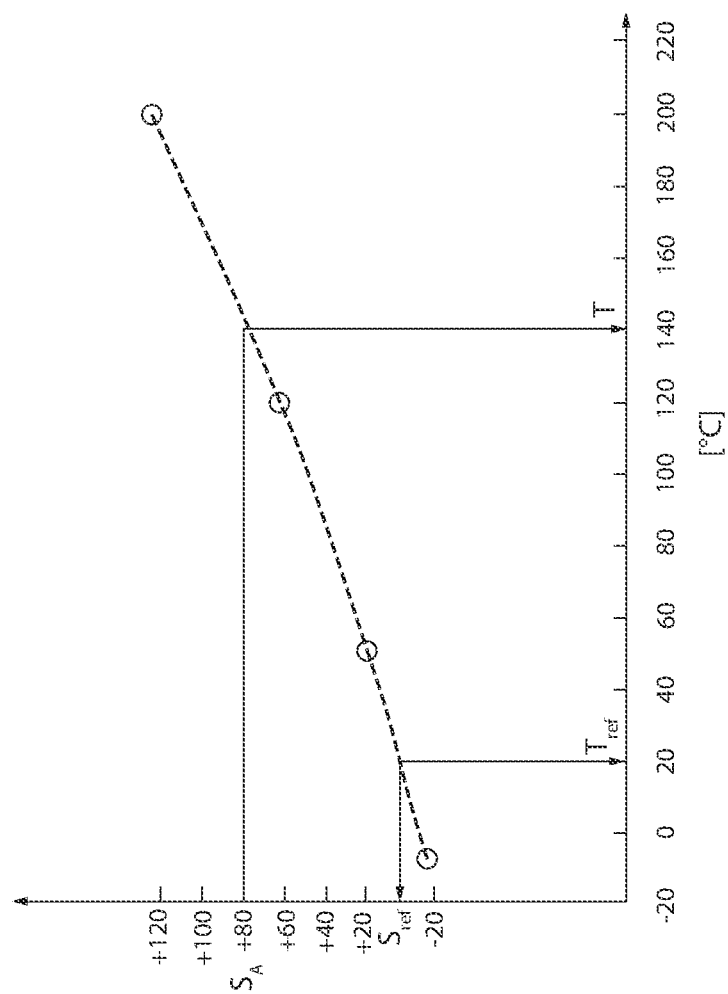
FIG. 6 is a diagram showing an operating characteristic to determine the temperature of the electromagnetic fuel injector of FIG. 1.

First of all, a preliminary set-up and adjustment step is provided, which is carried out in a controlled environment on at least one electromagnetic injector 1 (hereinafter referred to as master injector) representative of a given family of electromagnetic injectors 1. This preliminary step entails determining, in known operating and environmental conditions, a reference development C of the master electromagnetic injector 1 in the plane time/temperature of the master electromagnetic injector 1. In particular, the reference development C alternatively indicates the time needed by the master electromagnetic injector 1 to reach the threshold value $I_T$, $I_T^*$ or the time needed to shift from the threshold value Into the threshold value $I_{T2}$ or even the time needed by the voltage applied at the ends of the coil 7 to reach the first zeroing. The reference development C is shown in FIG. 6. In the description below, reference will explicitly be made to the case in which the time needed by the master electromagnetic injector 1 to reach the threshold value $I_T$, $I_T^*$ is used, but the method described herein can advantageously be used also in the other cases mentioned above.

During the normal operation, the method comprises a step for the initialization of an i-th electromagnetic injector 1 belonging to same family as the master electromagnetic injector 1. In other words, in order to carry out this initialization step, the reference development C of the master electromagnetic injector 1 of the same family is used for each i-th electromagnetic injector 1.

More in detail, the initialization step entails carrying out an initialization measurement of the time needed by the i-th electromagnetic injector 1 to reach the threshold value $I_T$, $I_T^*$, which, indeed, allows for an initialization (or "zero defining") on the reference development C. The initialization measurement takes place at a known temperature of the i-th electromagnetic injector 1 because the sensors of the internal combustion engine are used to identify the initial temperature of the i-th electromagnetic injector 1. The initialization measurement typically takes place during the first control phases of the i-th electromagnetic injector 1 and is associated with a known initialization temperature $T_{ref}$ of the vehicle, for example 20° C. (uniform temperature, which is obtained when the internal combustion engine is started). By so doing, the time $S_{i\text{-}simo}$ needed by the i-th electromagnetic injector 1 to reach the threshold value $I_T$, $I_T^*$ at the initialization temperature $T_{ref}$ is obtained. For example, the time $S_{i\text{-}simo}$ amounts to 520 µs at the initialization temperature $T_{ref}$ of 20° C.

After a given amount of time or after a given number of actuations of the i-th electromagnetic injector 1, the measurement of the time needed by the i-th electromagnetic injector 1 to reach the threshold value $I_T$, $I_T^*$ is repeated. The further measurements, following the initialization measurement, take place at unknown temperatures. For each measurement, the time S needed by the i-th electromagnetic injector 1 to reach the threshold value $I_T$, $I_T^*$ is obtained.

Then, the deviation Δ between the time S needed by the i-th electromagnetic injector 1 to reach the threshold value $I_T$, $I_T^*$ and the time $S_{i\text{-}simo}$ needed by the i-th electromagnetic injector 1 to reach the threshold value $I_T$, $I_T^*$ at the initialization temperature $T_{ref}$ is calculated.

For example, in case the time S needed by the i-th electromagnetic injector 1 to reach the threshold value $I_T$, $I_T^*$ is 600, the deviation Δ amount to +80 µs.

In order to determine the temperature T of the i-th electromagnetic injector 1, the deviation Δ that was just calculated is added to the initialization time $S_{ref}$ on the reference development C. The initialization time $S_{ref}$ is the time needed by the master electromagnetic injector 1 to reach the threshold value $I_T$, $I_T^*$ at the reference temperature $T_{ref}$. In other words, the initialization time $S_{ref}$ is the time that is obtained by means of the reference development C in order to reach the threshold value $I_T$, $I_T^*$ at the reference temperature $T_{ref}$. In other words, starting from the initialization time $S_{ref}$, one moves along the axis of the time needed by the i-th electromagnetic injector 1 to reach the threshold value $I_T$, $I_T^*$ on the reference development C by a quantity equal to the deviation Δ so as to reach a measurement time SΔ. The measurement time SΔ, which was just obtained from the deviation Δ and the initialization time $S_{ref}$, determines that the temperature T of the i-th electromagnetic injector 1 is 140° C. In other words, using the reference development C, the temperature T of the i-th electromagnetic injector 1 is associated with the measurement time SΔ.

According to a variant, the preliminary step entails defining a reference development C of the electromagnetic actuator 1 (by means of at least one master electromagnetic injector 1 as described above) in the plane temperature/time needed by the voltage applied at the ends of the coil 7 to reach the first zeroing; the following step entails carrying out an initialization measurement of the time needed by the i-th electromagnetic injector 1 to reach a first zeroing at a known initialization temperature $T_{ref}$; wherein, using said reference development C, the time $S_{i\text{-}simo}$ needed by the i-th electromagnetic injector 1 to reach the first zeroing is associated with the known initialization temperature $T_{ref}$; and, finally, after the initialization step, a step is provided in which to carry out a series of measurements in which to determine the time S needed by the i-th electromagnetic injector 1 to reach the first zeroing. For each one of said measurements, the deviation Δ between the time S needed by the i-th electromagnetic injector 1 to reach the first zeroing and the time $S_{i\text{-}simo}$ is calculated; and, finally, the temperature T of the i-th electromagnetic injector 1 is determined as a function of the deviation Δ and of an initialization time $S_{ref}$ of the master electromagnetic injector 1. In order to determine the temperature T of the i-th electromagnetic injector 1, the deviation Δ that was just calculated is added to the initialization time $S_{ref}$ on the reference development C. The initialization time $S_{ref}$ is the time needed by the master electromagnetic injector 1 to reach the first zeroing at the reference temperature $T_{ref}$. In other words, the initialization time $S_{ref}$ is the time that is obtained by means of the reference development C in order to reach the first zeroing at the reference temperature $T_{ref}$. In other words, starting from the initialization time $S_{ref}$, one moves along the axis of the time needed by the i-th electromagnetic injector 1 to reach the first zeroing on the reference development C by a quantity equal to the deviation Δ so as to reach a measurement time SΔ. The measurement time SΔ, which was just obtained from the deviation Δ and the initialization time $S_{ref}$, determines that the temperature T of the i-th electromagnetic injector 1 is 140° C. In other words, using the reference development C, the temperature T of the i-th electromagnetic injector 1 is associated with the measurement time SΔ.

Then, temperature T of the i-th electromagnetic injector 1 is compared with a critical value $T_C$, which is determined in a preliminary set-up phase and is variable as a function of the type of electromagnetic actuator. In case the temperature T of the i-th electromagnetic actuator 1 is greater than the critical value, the electronic control unit ECU is configured to take a series of measures aimed at protection the electromagnetic injector 1.

In particular, the electronic control unit ECU is configured to take any protection measure among the ones indicated below or a combination thereof:
- reduction of the frequency with which the electromagnetic injector 1 is operated;
- reduction of multi-injections in case the electromagnetic injector 1 is timed with a cylinder of an internal combustion engine;
- reduction of the pressure of the fuel;
- reduction of the peak current of the electromagnetic injector 1.

In case the protection measures do not lead to a reduction of the temperature T of the i-th electromagnetic injector 1 (which, hence, remains greater than the critical value $T_C$ for an amount of time ΔS), the electronic control unit ECU is configured to turn off the i-th electromagnetic injector 1.

The description above explicitly makes reference to the case of an electromagnetic injector 1, but it finds advantageous application in case of any electromagnetic actuator that is exposed, during its normal operation, to heat sources and/or that during its operation it undergoes temperature variations, chosen—for example—from the following (non-exhaustive) list: injectors of a water solution of urea for a SCR (Selective Catalytic Reduction) system for the after-treatment of $NO_x$ molecules, burners for an exhaust gas after-treatment system.

It should be pointed out that the possibility of working with Δ relative to a reference value $S_{ref}$ (the value $S_{ref}$ is experimentally obtained in a lab at a known temperature $T_{ref}$) allows the following temperature estimations to be freed from the burden of possible tolerances of the components of the electromagnetic actuators.

Furthermore, the method described so far has several advantages; in particular, it is simple and economic to be implemented, does not involve a high computing burden for the electronic control unit ECU and does not require dedicated sensors to detect the temperature of the electromagnetic actuator.

LIST OF REFERENCE NUMBERS 1 electromagnetic injector
2 injection nozzle
3 support body
4 supply channel
5 electromagnetic actuator
6 injection valve
7 coil
8 toroidal casing
9 fixed magnetic pole
10 movable armature
11 magnetic armature
12 magnetic washer
13 plunger
14 central hole
15 closing spring
16 striker body
X axis
ECU electronic control unit
T1 time instant
T2 time instant
T3 time instant
T10 time instant
T20 time instant
T30 time instant
T40 time instant
T50 time instant
IT threshold value
IT* threshold value
IP peak current
IH holding current
IT1 threshold value
IT2 threshold value
VP pre-charge voltage
IPC pre-charge current
C reference development
$T_{ref}$ initialization temperature
$S_{ref}$ initialization time
$S_{i\text{-}simo}$ time needed by the i-th injector
Δ deviation
S time
SΔ measurement time
T temperature
TC critical value
ΔS amount of time

The invention claimed is:

1. A method to estimate the temperature of an electromagnetic actuator (1) of an internal combustion engine having a coil (7), which is powered with a voltage (V) variable over time, which causes a current variable over time to flow through the coil (7); the method comprises:
  a) a preliminary step for at least one electromagnetic actuator (1) representative of a family of electromagnetic injectors (1), in which:
    to define a first threshold value ($I_T$, $I_T^*$, $I_{T1}$) for the current flowing in the coil (7) or for the voltage supplied to the coil (7); and
    to obtain a reference development (C) for the family of electromagnetic injectors (1) defined in the plane temperature of the mater electromagnetic actuator (1)/time used by the master electromagnetic actuator (1) to reach said first threshold value ($I_T$, $I_T^*$, $I_{T1}$);
  b) a normal operation step for each i-th electromagnetic actuator (1), in which:
    to carry out an initialization measurement, in which a first initialization time ($S_{i\text{-}simo}$) is determined, which is used by the i-th electromagnetic actuator (1) to reach said first threshold value ($I_T$, $I_T^*$, $I_{T1}$) at a known initialization temperature ($T_{ref}$); and in which to determine, by means of the reference development (C), a second initialization time ($S_{ref}$) used by the master electromagnetic actuator (1) of the same family as the i-th electromagnetic actuator (1) to reach said first threshold temperature ($I_T$, $I_T^*$, $I_{T1}$) at the known initialization temperature ($T_{ref}$); and after the initialization measurement, to carry out a series of measurements, in which:
  to determine the time needed by the electromagnetic actuator (1) to reach said first threshold value ($I_T$, $I_T^*$, $I_{T1}$);
  to calculate the deviation ($\Delta$) between the time (S) needed by the electromagnetic actuator (1) to reach said first threshold value ($I_T$, $I_T^*$, $I_{T1}$) and the initialization time ($S_{i\text{-}simo}$);
  starting from the second initialization time ($S_{ref}$) on the reference development (C), to move along the axis of the time needed by the i-th electromagnetic actuator (1) to reach said first threshold value ($I_T$, $I_T^*$, $I_{T1}$) by a quantity equal to the deviation ($\Delta$) so as to reach a measurement time ($S\Delta$); and
  to estimate the temperature (T) of the i-th electromagnetic actuator (1) corresponding to said measurement time ($S\Delta$) on the reference development (C).

2. The method according to claim 1, wherein the first threshold value ($I_T$) is smaller than a peak current ($I_P$) flowing through the coil (7) and preferably is equal to a value that avoids possible saturation phenomena of the ferromagnetic material.

3. The method according to claim 1, wherein the first threshold value ($I_T^*$) is smaller than or equal to a pre-charge current ($I_{PC}$) flowing through the coil (7).

4. The method according to claim 1, wherein the first threshold value is the zero value of the voltage applied at the ends of the coil (7).

5. The method according to claim 1 and comprising the further steps of:
  defining a second threshold value ($I_{T2}$) for the current flowing through the coil (7); and
  defining the reference development (C) of the electromagnetic actuator (1) in the plane temperature of the master electromagnetic actuator (1)/time used by the master electromagnetic actuator (1) to shift from the first threshold value ($I_{T1}$) to the second threshold value ($I_{T2}$).

6. The method according to claim 1 and comprising the further step of comparing the temperature (T) of the electromagnetic actuator (1) with a critical value ($T_C$); and taking a series of measures aimed at protecting the electromagnetic actuator (1) in case the temperature (T) of the electromagnetic actuator (1) exceeds the critical value ($T_C$).

7. The method according to claim 6, wherein the measures aimed at protecting the electromagnetic actuator (1) comprise:
  reduction of the frequency with which the electromagnetic actuator (1) is operated; and/or
  reduction of multi-injections in case the electromagnetic actuator (1) is timed with a cylinder of an internal combustion engine; and/or
  reduction of the pressure of the fuel; and/or
  reduction of a peak current ($I_P$) of the electromagnetic actuator (1).

8. The method according to claim 6 and comprising the further step of deactivating the electromagnetic actuator (1) in case the temperature (T) of the electromagnetic actuator (1) keeps exceeding the critical value ($T_C$) for a predetermined amount of time ($\Delta S$) at the end of the measures aimed at protecting the electromagnetic actuator (1).

9. The method according to claim 1, wherein the electromagnetic actuator (1) is preferably chosen among: fuel injectors (1) for direct or indirect injection systems, injectors for a water solution of urea for a SCR (Selective Catalytic Reduction) system for the after-treatment of $NO_x$ molecules, burners for an exhaust gas after-treatment system.

* * * * *